April 5, 1938.  E. W. RUPPEE  2,113,518
FRUIT PICKER
Filed July 14, 1937
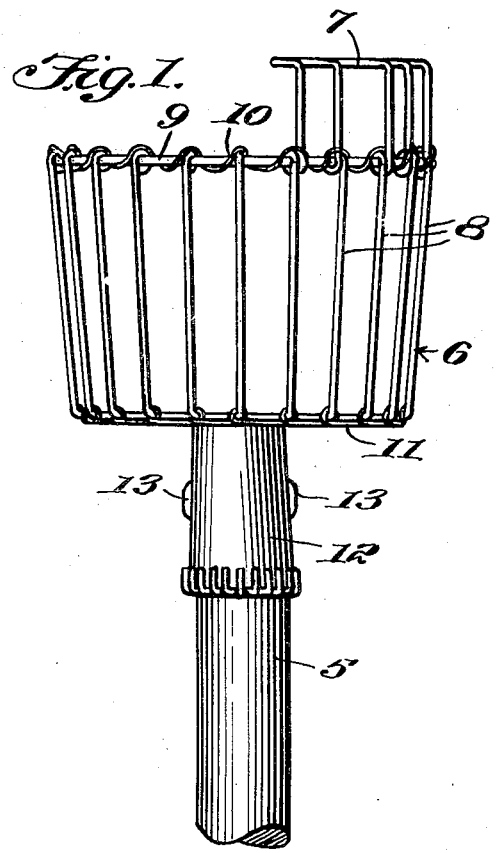
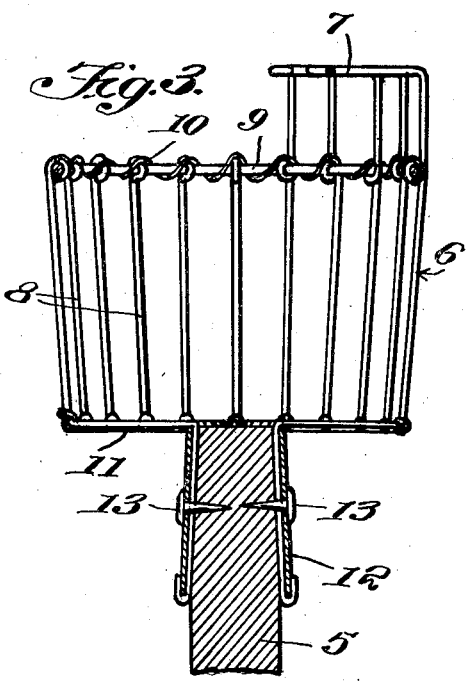
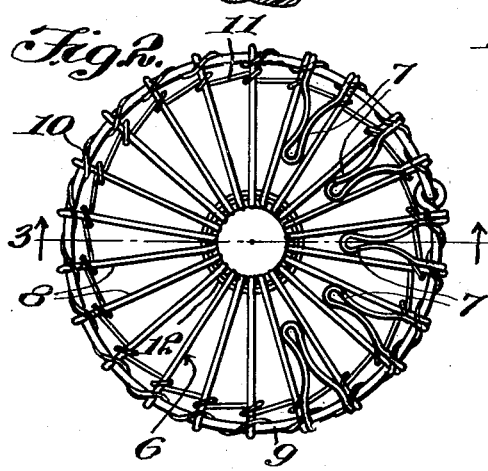
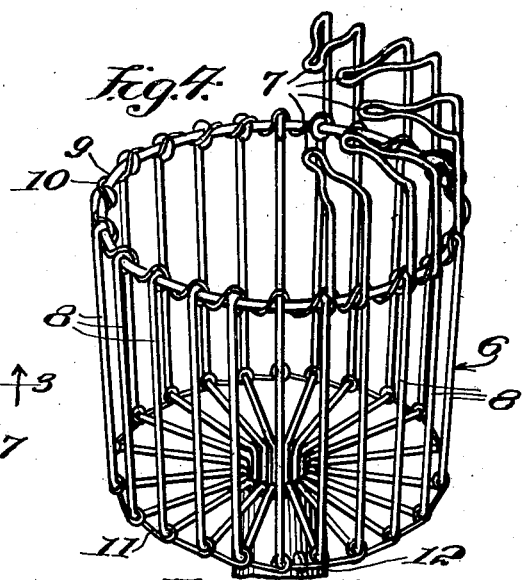
Edward W. Ruppee
INVENTOR
BY Victor J. Evans & Co.
ATTORNEYS
WITNESS J. T. L. Wright Patented Apr. 5, 1938

2,113,518

UNITED STATES PATENT OFFICE 2,113,518

FRUIT PICKER

Edward W. Ruppee, Oakdale, Tenn.

Application July 14, 1937, Serial No. 153,632

1 Claim. (Cl. 56—339)

This invention relates to fruit culture and more particularly to fruit pickers.

One of the principal objects of my invention is to provide means for picking fruit easily and quickly from trees and which will be so constructed that it will be simple in operation and economical in cost.

Another object of my invention is to provide means whereby small as well as large fruit may be readily picked from trees and vines.

Other objects and advantages will be apparent from the following description, appended claim and annexed drawing.

Referring to the drawing wherein like reference characters designate like parts throughout the several views:

Fig. 1 is a side elevation of my invention.

Fig. 2 is a top plan view thereof.

Fig. 3 is a sectional view taken on a line 3—3 of Fig. 2.

Fig. 4 is a perspective view of the invention.

Referring to the drawing, there is illustrated a fruit picker comprising a handle 5 having a basket 6 mounted on its upper end, the basket being opened at its top and provided with overlying spaced fruit picking jaws 7.

The basket is constructed of relatively stiff strands of wire 8, formed with upwardly and outwardly inclined, laterally offset and depending sections. The inclined and offset sections are arranged in relation to each other to define a substantially inverted frustrum shaped basket, the inclined sections forming the sides and the offset sections the bottom. The depending sections form a tapered socket of a smaller diameter than said basket and receive therein a portion of the handle.

The upper ends of the inclined sections are connected to a circumferentially extending wire member 9 by means of loops fashioned thereon. An interconnecting strand of wire 10, carried by said member, secures the inclined sections in spaced relation. A similar strand of wire 11 extends around the bottom of the basket and secures the lower ends of the inclined sections together in spaced relation.

A number of the strands of wire extend vertically of the member 9 and are bent inwardly to form the radially disposed jaws 7 which overlie the basket. Each of said jaws constitutes a continuous strand of wire formed with spaced radially extending sections connected together by an ovate loop section.

The sections of the strands forming the socket surround the tapered end portion of the handle 5, said strands being secured thereto by means of a similar shaped metal ferrule 12. The lower ends of the strands, forming the socket, extend beyond the lower edge of said ferrule and are folded over the outer face thereof. Suitable nails 13 or the like secure the socket and ferrule to the handle.

From the foregoing, it will be apparent that the particular shape of the picker, especially the jaws forming a part thereof, is such that small as well as large fruit when picked from the trees or vines will readily fall within the basket. The configuration and spacing of the jaws prevent stems of the fruit from becoming jammed and held therebetween, thus eliminating the necessity of frequently lowering the basket to disengage the stems. By eliminating the frequent lowering of the backet, for disengaging the stems, a speedy fruit picking operation is obtained.

It is to be distinctly understood that various changes and modifications in construction may be resorted to without departing from the spirit of the invention or scope of the appended claim.

Having described my invention, what I claim is:

A fruit picker, comprising, a plurality of wires fashioned to form an open top basket formed with a handle socket, said wires having substantially perpendicular extending sections forming the sides of said basket, laterally offset right angularly disposed sections forming the bottom of said basket and right angularly disposed downwardly extending sections from said bottom forming said socket; circumferential extending members connecting the tops and bottoms of said perpendicular extending sections together; a number of said perpendicular wires extending above one of said circumferential members and having laterally offset right angularly disposed hook sections overlying the top of said basket; a handle in said socket; and means securing said handle in said socket.

EDWARD W. RUPPEE.